(12) United States Patent
Guo et al.

(10) Patent No.: US 8,568,671 B2
(45) Date of Patent: Oct. 29, 2013

(54) METHOD FOR PREPARING METALLURGICAL-GRADE ALUMINA BY USING FLUIDIZED BED FLY ASH

(75) Inventors: Zhaohua Guo, Beijing (CN); Cundi Wei, Beijing (CN); Peiping Zhang, Beijing (CN); Jianguo Han, Beijing (CN); Junzhou Chi, Beijing (CN); Yanbin Sun, Beijing (CN); Yixin Zhao, Beijing (CN)

(73) Assignee: China Shenhua Energy Company Limited, Beijing (CN)

( * ) Notice: Subject to any disclaimer, the term of this patent is extended or adjusted under 35 U.S.C. 154(b) by 0 days.

(21) Appl. No.: 13/643,378

(22) PCT Filed: Apr. 27, 2011

(86) PCT No.: PCT/CN2011/073371
§ 371 (c)(1),
(2), (4) Date: Dec. 17, 2012

(87) PCT Pub. No.: WO2011/134398
PCT Pub. Date: Nov. 3, 2011

(65) Prior Publication Data
US 2013/0115149 A1   May 9, 2013

(30) Foreign Application Priority Data
Apr. 27, 2010   (CN) .......................... 2010 1 0161879

(51) Int. Cl.
*C01F 7/00* (2006.01)
(52) U.S. Cl.
USPC ............................ 423/112; 423/113; 423/625
(58) Field of Classification Search
USPC .......................................... 423/112, 113, 625
See application file for complete search history.

(56) References Cited

U.S. PATENT DOCUMENTS 4,652,433 A    3/1987   Ashworth et al.

FOREIGN PATENT DOCUMENTS

| CN | 1030217 A | 1/1989 |
|---|---|---|
| CN | 1539735 A | 10/2004 |
| CN | 1548374 A | 11/2004 |
| CN | 1644506 A | 7/2005 |
| CN | 1792802 A | 6/2006 |
| CN | 1920067 A | 2/2007 |
| CN | 1923695 A | 3/2007 |
| CN | 1927716 A | 3/2007 |

(Continued)

OTHER PUBLICATIONS

CN 101870489 A, Oct. 27, 2010, abstract.*

(Continued)

*Primary Examiner* — Steven Bos
(74) *Attorney, Agent, or Firm* — Renner, Otto, Boisselle & Sklar, LLP

(57) ABSTRACT

Provided a method for preparing metallurgical-grade alumina by using fluidized-bed fly ash, comprising: a) removing iron by wet magnetic separation after crushing the fly ash; b) reacting the fly ash after magnetic separation with hydrochloric acid to obtain a hydrochloric leachate; c) passing the hydrochloric leachate through macro-porous cationic resin to deeply remove iron to obtain a refined aluminum chloride solution; d) concentrating and crystallizing the refined aluminum chloride solution to obtain an aluminum chloride crystal; and e) calcining the aluminum chloride crystal to obtain the metallurgical-grade alumina. The method is simple, the procedure is easy to be controlled, the extraction efficiency of alumina is high, the production coast is low, and the product quality is steady.

25 Claims, 2 Drawing Sheets

(56) References Cited

FOREIGN PATENT DOCUMENTS

| CN | 101028936 A | 9/2007 |
|---|---|---|
| CN | 101041449 A | 9/2007 |
| CN | 101041450 A | 9/2007 |
| CN | 101045543 A | 10/2007 |
| CN | 101049935 A | 10/2007 |
| CN | 101070173 A | 11/2007 |
| CN | 101085679 A | 12/2007 |
| CN | 101125656 A | 2/2008 |
| CN | 101172634 A | 5/2008 |
| CN | 101200298 A | 6/2008 |
| CN | 101254933 A | 9/2008 |
| CN | 101302021 A | 11/2008 |
| CN | 101306826 A | 11/2008 |
| CN | 201179479 Y | 1/2009 |
| CN | 101397146 A | 4/2009 |
| CN | 101811712 A | 8/2010 |
| CN | 101863498 A | 10/2010 |

OTHER PUBLICATIONS

International Search Report for corresponding International Application No. PCT/CN2011/073371 mailed Aug. 11, 2011 and English translation.

Written Opinion of the International Searching Authority for corresponding International Application No. PCT/CN2011/073371 mailed Aug. 11, 2011 and English translation.

International Preliminary Report on Patentability for corresponding International Application No. PCT/CN2011/073371 mailed Jul. 25, 2012 and English translation.

Dao, Zhengchao, "Preliminary Study of Effect of Geometry and Unit Size of Inducing Medium of Strong Magnetic Separator on Separating index", Yunnan Metallurgy, 1982, No. 5, pp. 33-35 and 43, ISSN: 1006-0308 and English abstract.

* cited by examiner

METHOD FOR PREPARING METALLURGICAL-GRADE ALUMINA BY USING FLUIDIZED BED FLY ASH

This application is a national phase of International Application No. PCT/CN2011/073371 filed Apr. 27, 2011 and claims priority to Chinese Application No. 201010161879.X filed Apr. 27, 2010.

TECHNICAL FIELD

The present invention relates to a comprehensive utilization of fluidized-bed fly ash and in particular relates to a method for preparing metallurgical-grade alumina by using the fluidized-bed fly ash.

BACKGROUND

Fly ash is a waste discharged from the coal-fired power station. In China, the coal is used as one of the main energy sources and hundreds of millions tons of fly ash are discharged from power stations each year. The discharge of the fly ash not only occupies a large area of land, but also pollutes the environment seriously. How to handle and utilize the fly ash becomes a very important problem. The fly ash contains a number of components that can be utilized, for example, circulating fluidized-bed fly ash usually contains about 30 to 50 percent by weight of alumina. Nowadays, as the bauxite resources become gradually rare, it is an efficient way to extract valuable materials, such as alumina from the fly ash and provide a highly comprehensive utilization for the fly ash, which is of great social and economic benefits.

In light of different conditions of calcinations, the fly ash is classified into pulverized coal-fired boiler fly ash and circulating fluidized-bed fly ash. The pulverized coal-fired boiler fly ash is produced when coal is burned at very high temperatures (1400-1600° C.), wherein the component of alumina is in glassy state or present as mullite crystals or corundum crystals. While the combustion temperature of circulating fluidized-bed fly ash is much lower than that of traditional pulverized coal-fired boiler fly ash, only about 850° C. Different combustion temperatures make a substantial difference in phase composition between the pulverized coal-fired boiler fly ash and circulating fluidized-bed fly ash, that is, amorphous kaolinite enters into the main phase composition of the circulating fluidized-bed fly ash, in which silicon dioxide, alumina and ferric oxide possess excellent activity.

By now, methods used for extracting alumina from fly ash are basically divided into two categories, acid leaching method and alkali leaching method. Further, the alkali leaching method may be divided into limestone (soda-lime) sintering method and sodium carbonate sintering method.

The limestone (soda-lime) sintering process is such a method that the fly ash is mixed with limestone (soda-lime) and the mixture is calcined to be activated at a very high temperature (1320-1400° C.), thereby alumina and silicon dioxide contained in the fly ash react respectively with limestone (soda-lime) to form calcium aluminate and dicalcium silicate. The calcined ash was leached with sodium carbonate solution and filtered to remove unwanted substances, thus the calcium aluminate enters the solution in the form of sodium metaaluminate, from which, after desilicification and carbon precipitation (or seed precipitation) treatments, aluminum hydroxide is thereby obtained. Subsequently, the obtained aluminum hydroxide is calcined to obtain alumina product. Moreover, after the filtering treatment, the dicalcium silicate turns into silicium-calcium slag which may be employed as raw material for cement. In CN 101070173A, CN 101306826A, CN 101049935A, CN 101302021A, CN 101125656A, CN 101041449A, CN 1030217A, CN 1644506A, CN 101028936A, CN 1548374A, CN 101085679A, CN 1539735A, for example, the limestone (soda-lime) sintering method or improved limestone sintering method is employed respectively. The sintering raw material used for the limestone sintering method is cheap limestone, which relatively reduce the production cost of alumina. However, there are many disadvantages exist in this process. Firstly, large quantities of silicium-calcium slag is produced during the leaching process. About 8-10 tons of silicium-calcium slag is produced for every ton of alumina obtained. Such silicium-calcium slag is prone to be another discharge of waste which even requires more occupancies if the slag can not be consumed thoroughly by the building materials market. Further, the silicone dioxide is not utilized with a high value. Secondly, the energy consumption in the limestone sintering process is very high, since the fly ash is calcined in a very high temperature, and the requirements on its procedures and equipments are also high. Thirdly, the recovery efficiency of alkali is very low as large quantities of slag are produced during the alkali leaching process, which increases the production cost.

The sodium carbonate sintering method is such a method that the fly ash and sodium carbonate are calcined at a high temperature (750-1450° C.), during which, alumina and silicon dioxide contained in the fly ash are activated simultaneously, thus the calcined fly ash needs to be further acidized through carbonation reaction or reacting the calcined fly ash with sulfuric acid/hydrochloric acid to separate silicone and aluminum. Such method, as alkali leaching comes before acid leaching, is also referred to as acid-alkali combination method. For example, CN 101041450A, CN 101200298A, CN 101172634A, CN 101254933A have described the sodium carbonate sintering method. As compared with the limestone sintering method, less slag is produced in the sodium carbonate sintering method and silicone dioxide in the fly ash can be utilized with a high value. However, the energy consumption of the process is high and its procedures are complicated since the fly ash needs to be calcined in a very high temperature and the calcined ash needs to further act with acid in order to separate silicone and aluminum.

As described above, in both limestone sintering method and sodium carbonate sintering method, the fly ash needs to be activated by reacting with limestone/sodium carbonate at a very high temperature. Consequently, such methods are suitable for pulverized coal-fired boiler fly ash which has weak activity. Whereas, the circulating fluidized-bed fly ash can react with acid without activation due to its higher activity.

The acid leaching method is such a method that the fly ash react with acid solution directly to obtain aluminum-salt solution and the aluminum-salt is calcined, so as to be decomposed to prepare alumina For example, CN 1923695A, CN 1920067A, CN 101045543A, CN 101397146A, CN 1792802A, CN 1927716A have described that alumina is extracted from fly ash by use of the acid leaching method. The fly ash usually reacts with acid at a temperature lower than 300° C. As compared with the high calcination temperatures used for the limestone sintering method and sodium carbonate sintering method, the energy consumption of the acid leaching method decreases dramatically. Moreover, all silicone dioxides will be kept in the solid residues since it does not react with acid. Furthermore, some impurities, such as calcium and sodium, will not be introduced in the alumina product. As such, it is possible to obtain high purity alumina theoretically. However, one of the defects of the acid leaching method resides in that soluble impurities, such as iron, will enter the solution, resulting in that the obtained alumina contains quite a number of iron and the like which are difficult to be removed. One solution to this is to dissolve the alumina obtained via the acid leaching method by alkali, such that aluminum is turned into sodium metaaluminate and enters solution, while the impurities, such as iron, will precipitate in form of hydroxide, such that the iron is removed from the alumina product. Since acid dissolving and alkali dissolving are both necessary in such method, its processes are complicated and its production cost is increased.

SUMMARY OF THE INVENTION

The object of the invention is to provide an improved method for preparing metallurgical-grade alumina by using the fly ash as the raw material. The method is simple, the production cost is low, and the product quality is steady.

The method for preparing metallurgical-grade alumina by using the fly ash as the raw material according to the invention basically comprises the following steps:

a) crushing the fly ash to a size of 100 mesh or smaller, adding water into therein to prepare a slurry having a solid content of 20-40 wt %, removing iron from the slurry by wet magnetic separation, such that Fe content (based on ferric oxide) of the fly ash is reduced to 1.0 wt % or less, and filtering the slurry to obtain a filter cake;

b) adding hydrochloric acid into the filter cake to react the fly ash with the hydrochloric acid, and then subjecting the reaction product to solid-liquid separation and rinse to yield a hydrochloric leachate having a pH value in the range of 1-3;

c) passing the hydrochloric leachate through a column loaded with a macro-porous cationic resin to further remove iron to obtain a refined aluminum chloride solution;

d) subjecting the refined aluminum chloride solution to vacuum concentration, then cooling the concentrated solution for crystallization, and conducting solid-liquid separation to obtain crystalline aluminum chloride; and e) calcining the crystalline aluminum chloride with an one-stage process at a temperature in the range of 900-1200° C. for 1-4 hours to obtain the metallurgical-grade alumina; or calcining the crystalline aluminum chloride with a two-stage process at a temperature in the range of 300-500° C. for 1-2 hours, then at an elevated temperature in the range of 950-1100° C. for additional 1-3 hours to obtain the metallurgical-grade alumina Hereinafter the method according to the invention will be further described in detail, but the present invention is not limited thereto.

In step a) according to an embodiment of the invention, the fly ash includes, but is not limited to circulating fluidized-bed fly ash. Coal kaolin and coal gangue may also be used as raw materials. First, the fly ash is crushed to a size of 100 mesh or smaller, and water is added therein to prepare a slurry having a solid content of 20-40 wt %, preferably 30-35 wt %. The iron contained in the fly ash is removed via a magnetic separator by means of wet magnetic separation, such that the iron content (based on ferric oxide) of the fly ash is reduced to 1.0 wt % or less, and then the slurry is filtered to provide a filter cake having a solid content of 25-50 wt %, preferably 30-45 wt %.

Any conventional magnetic separator suitable for removing iron from powder-like materials may be used for the wet magnetic separation in the present invention, as long as the iron content of the fly ash can be reduced to 1.0 wt % or less.

Preferably, the magnetic separator used for fly ash is a vertical ring magnetic separator. Further preferably, the vertical ring magnetic separator comprises a rotating ring, an inductive medium, an upper iron yoke, a lower iron yoke, a magnetic exciting coil, a feeding opening, a tailing bucket and a water washing device, in which the feeding opening is used for feeding the coal ash to be de-ironed, the tailing bucket is used for discharging the non-magnetic particles after de-ironing, the upper iron yoke and the lower iron yoke are respectively arranged at the inner and outer sides of the lower portion of the rotating ring, the water washing device is arranged above the rotating ring, the inductive medium is arranged in the rotating ring, the magnetic exciting coil is arranged at the periphery of the upper iron yoke and the lower iron yoke so as to make the upper iron yoke and the lower iron yoke to be a pair of magnetic poles for generating a magnetic field in the vertical direction, and the inductive medium is layers of steel plate meshes, each steel plate mesh is woven by wires, and the edges of the wires have prismatic sharp angles.

Preferably, the upper iron yoke and the lower iron yoke are formed integrally, and are arranged, in a plane perpendicular to the rotating ring, to surround the inner and outer sides of the lower portion of the rotating ring.

Preferably, the vertical ring magnetic separator further comprises a pressure balance chamber water jacket disposed adjacent to the magnetic exciting coil.

Preferably, the steel plate mesh is made of 1Cr17.

Preferably, the magnetic exciting coil is a flat wire solenoid coil which is aluminum coated by varnish and doubly enwrapped by fiberglass.

Preferably, the steel plate mesh has a medium layer spacing of 2-5 mm. More preferably, the steel plate mesh has a medium layer spacing of 3 mm.

Preferably, the steel plate mesh has a thickness of 0.8-1.5 mm, a mesh grid size of 3 mm×8 mm-8 mm×15 mm, and a wire width of 1-2 mm. More preferably, the steel plate mesh has a thickness of 1 mm, a mesh grid size of 5 mm×10 mm, and a wire width of 1.6 mm.

Preferably, the vertical ring magnetic separator further comprises a pulsating mechanism, which is coupled with the tailing bucket via a rubber plate.

Preferably, the inductive medium is provided in the entire circle of the rotating ring.

When the above-said vertical ring magnetic separator is used for magnetic separation for de-ironing, it is necessary to timely test the iron content in the slurry subjecting to the magnetic separation. When the iron content in the slurry is equal to or lower than a predetermined value, discharging the slurry; when the iron content is higher than the predetermined value, the slurry is returned to the feeding opening for further magnetic separation. Such magnetic separation may be repeated 2-4 times, preferably 2-3 times.

Preferably, when magnetically separating the slurry by the vertical ring magnetic separator, the vertical ring magnetic separator provides a magnetic field strength of 15,000 Gs or more, further preferably 15,000-20,000 Gs, more preferably 15,000-17,500 Gs.

In step b) according to an embodiment of the invention, the fly ash reacts with acid by adding hydrochloric acid with a concentration of 20-37 wt %, preferably 20-30 wt % to said filter cake. The molar ratio of HCl contained in the hydrochloric acid to alumina contained in the fly ash is 4:1-9:1, preferably 4.5:1-6:1. Said reaction performs at a temperature of 100-200° C., preferably 130-150° C. and under a pressure of 0.1-2.5 MPa, preferably 0.3-1.0 MPa. The reaction time is 0.5-4.0 hours, preferably 1.5-2.5 hours. Then, the reaction product is subjected to a solid-liquid separation and is rinsed to yield a hydrochloric leachate having a pH value of 1-3. The process for the solid-liquid separation may be any of conventional methods, such as settling separation, vacuum filtration, pressure filtration or the like.

In addition, the rinse to the residue after the acid-leaching may be any routine process with water. Such rinse process may be repeated 2 times or more, for example, 2-4 times, until the residue is nearly neutralizing, for example, with pH about 5-6.

In step c) according to an embodiment of the invention, said macro-porous cationic resin may be strong-acid-cationic resin, such as styrene resins or acrylic resins. The essential performances of the resin include moisture content of 50.5-70.0%, exchange capacity of 3.60 mmol/g or more, volume exchange capacity of 1.20 mmol/g or more, bulk density in wet state of 0.60-0.80 g/ml, particle size of 0.315-1.250 mm, available particle size of 0.400-0.700 mm and maximum working temperature of 95° C. For example, said resin may be any one of D001, 732, 742, 7020H, 7120H, JK008 and SPC-1.

The hydrochloric leachate obtained from step b) passes through the macro-porous cationic resin loaded column to deeply remove iron contained in the leachate thus to obtain a refined aluminum chloride solution. The hydrochloric leachate may pass through the resin column in a conventional way. However, step c) is preferably conducted in such a way that the hydrochloric leachate passes through the resin column in a bottom-in and top-out manner, such that the leachate flows upwards piston-like in the gaps of resin, with a volume flux of 1-4 times over resin volume per hour, preferably 2-3 times, at 20-90° C., preferably 60-80° C. The resin column may be single column or two cascaded columns.

In step c), a method for eluting and regenerating said macro-porous cationic resin of comprises the steps of:
1) eluting the macro-porous cationic resin which has been saturation with water or 2-10 wt % hydrochloric acid as eluent;
2) regenerating the eluted macro-porous cationic resin with 2-10 wt % hydrochloric acid The conditions of the elution may include that the eluting temperature is 20-60° C., the amount of the eluent is 1-3 times over the volume of the resin, the volume flux of the eluent is 1-3 times over resin volume per hour, and the eluent passes through the resin column in a top-in and bottom-out way during the elution.

The conditions of the regeneration may include that the 2-10 wt % hydrochloric acid passes through said macro-porous cationic resin column in a top-in and bottom-out way, the regenerating temperature is 20-60° C., the amount of the hydrochloric acid is 1-2 times over the volume of the resin, and the volume flux of the hydrochloric acid is 1-3 times over resin volume per hour. The macro-porous cationic resin regains adsorption capacity after the regeneration.

In step d) according to an embodiment of the invention, the refined aluminum chloride solution is subjected to vacuum concentration at a pressure in the range of −0.03 to −0.07 MPa, preferably in the range of −0.04 to −0.06 MPa, and a temperature in the range of 50-110° C., preferably 70-80° C. The concentrated solution is cooled to form aluminum chloride crystal. The weight of the crystal is controlled between 40% and 65% with respect to a whole amount of the refined aluminum chloride solution, so that most aluminum chloride can be crystallized out of the solution. The impurities such as iron chloride are kept in the solution since the concentrations of them are very low.

A solid-liquid separation is following the above crystallization, and the mother liquid obtained from the separation is recycled to the refined solution for further concentration and crystallization. When the mother liquid is recycled for certain times, the impurities content is relatively high, thus it is necessary to remove iron from the mother liquid by use of the resin or put the filtered stock into other uses. The process for solid-liquid separation may be any conventional method, such as centrifugation, belt-type vacuum filtration or the like.

In step e) according to an embodiment of the invention, the aluminum chloride crystal obtained from step d) is calcined at a temperature in the range of 900-1200° C., preferably 950-1100° C., to obtain the metallurgical-grade alumina. Said calcination may be one-stage calcination or multiple-stage calcination, one-stage calcination is preferred. In the one-stage calcination, the aluminum chloride crystal is directly heated to 900-1200° C. and calcined for 1-4 hours and the alumina product is obtained via the thermal decomposition of the crystal. In the multiple-stage calcination, the aluminum chloride crystal is firstly heated for 1-4 hours at a temperature of 300-500° C. to decompose most crystal aluminum chloride, and then calcined at 900-1200° C. for 1-3 hours to obtain alumina product. Hydrochloride gas generated during the thermal decomposition may be absorbed by an absorbing column in a circular manner to prepare hydrochloric acid which may be used for the acid-leaching process of the invention.

As compared with the processes in the prior art, the advantages of the present invention are as the following aspects. The method is simple, the procedure is easy to be controlled, the extraction efficiency of alumina is high, the production coast is low, and the product quality is steady. The circulating fluidized-bed fly ash with high activity is adopted as the raw material for the invention and alumina is extracted from the fly ash via direct acid-leaching process, which saves the step of calcination with presence of sodium carbonate at a high temperature and thus simplifies the procedures and reduces the production cost. Moreover, without addition of alkali, sodium oxide as an impurity can be avoided being introduced in the system. The acid leaching of the fly ash occurs in acid-resisting reactor at a moderate temperature (in the range of 100-200° C.), and thus the leaching efficiency of alumina is high, being 80% or more. As compared with de-ironing process via alkali leaching method, the de-ironing process via the combination of magnetic separation and the resin adsorption is simpler, the production cost is lower, and iron removing effect is better. The alumina product obtained via the method according to the invention contains $Al_2O_3$ of 98.9 wt % or more, $Fe_2O_3$ of 0.004 wt % or less, $SiO_2$ of 0.02 wt % or less and $Na_2O$ of 0.008 wt % or less, which meets the requirements on purity of metallurgical-grade alumina Class I described in Nonferrous Metal Industry Standard "YS/T274-1998 Alumina" of the People's Republic of China. In particular, the contents of $Fe_2O_3$ and $Na_2O$ in the product of the invention are much less than the Standard values of 0.02 wt % and 0.5 wt % respectively. As compared with the major alumina-producing enterprises (such as Alcoa of Australia Ltd., Spanish Alumina Ltd., Queensland Alumina Ltd., Aluminum de Greece, Kaiser Aluminum Corp.), the alumina product obtained via the method of the present invention is better than other similar products in $Al_2O_3$ content and impurities (such as $Fe_2O_3$, $SiO_2$ and $Fe_2O_3$) contents.

In addition, since the improved magnetic separation apparatus is used in the present invention, the iron removing efficiency is improved by 20% or more, and the iron removing rate is improved from 60% to 80%, which significantly relieving the burden of de-ironing from solution in the subsequent processes, and thereby reducing the production cost and improving the production efficiency.

DETAILED DESCRIPTION OF THE INVENTION

Hereafter the method according to the present invention for preparing metallurgical-grade alumina by using fly ash as raw material will be further described in detail with reference to the drawings, however, it should be understood that the present invention is not limited thereto in any way.

Figure 1:
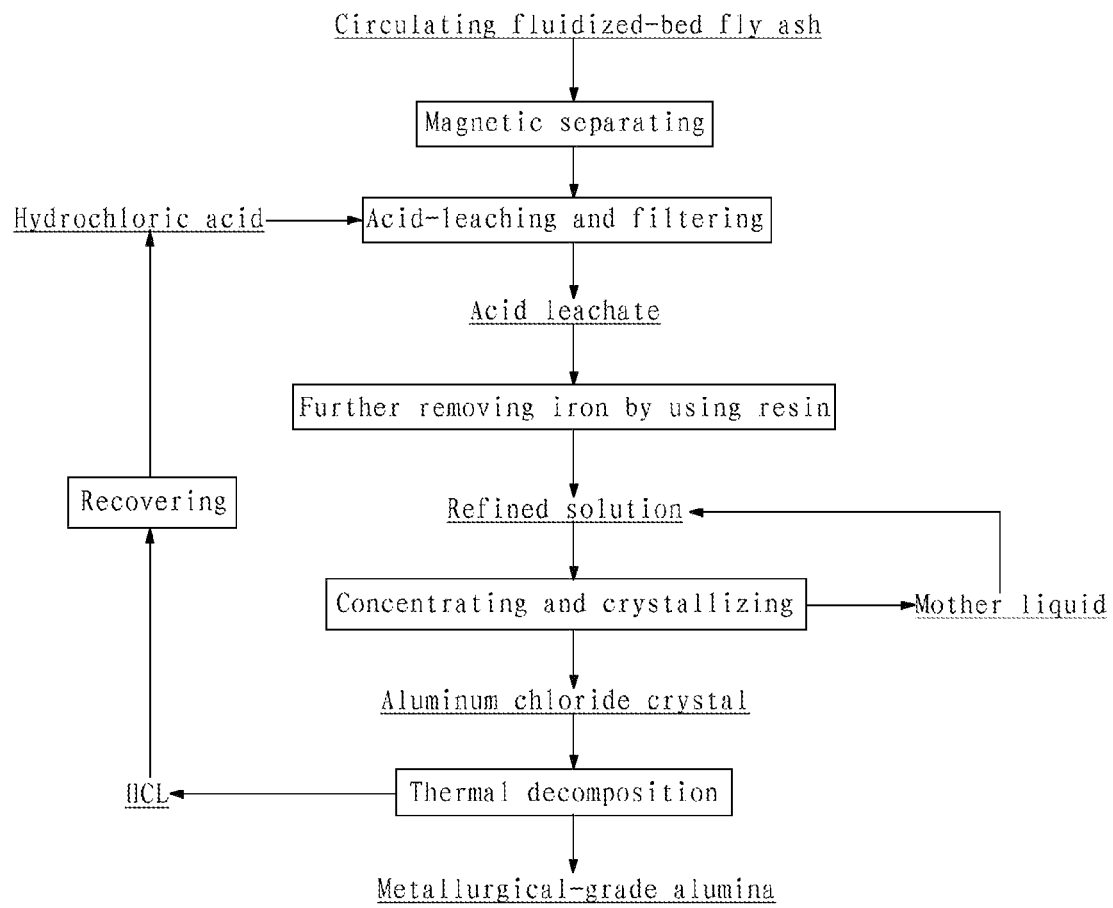
FIG. 1 is a flow diagram of the method according to the present invention.
Figure 2:
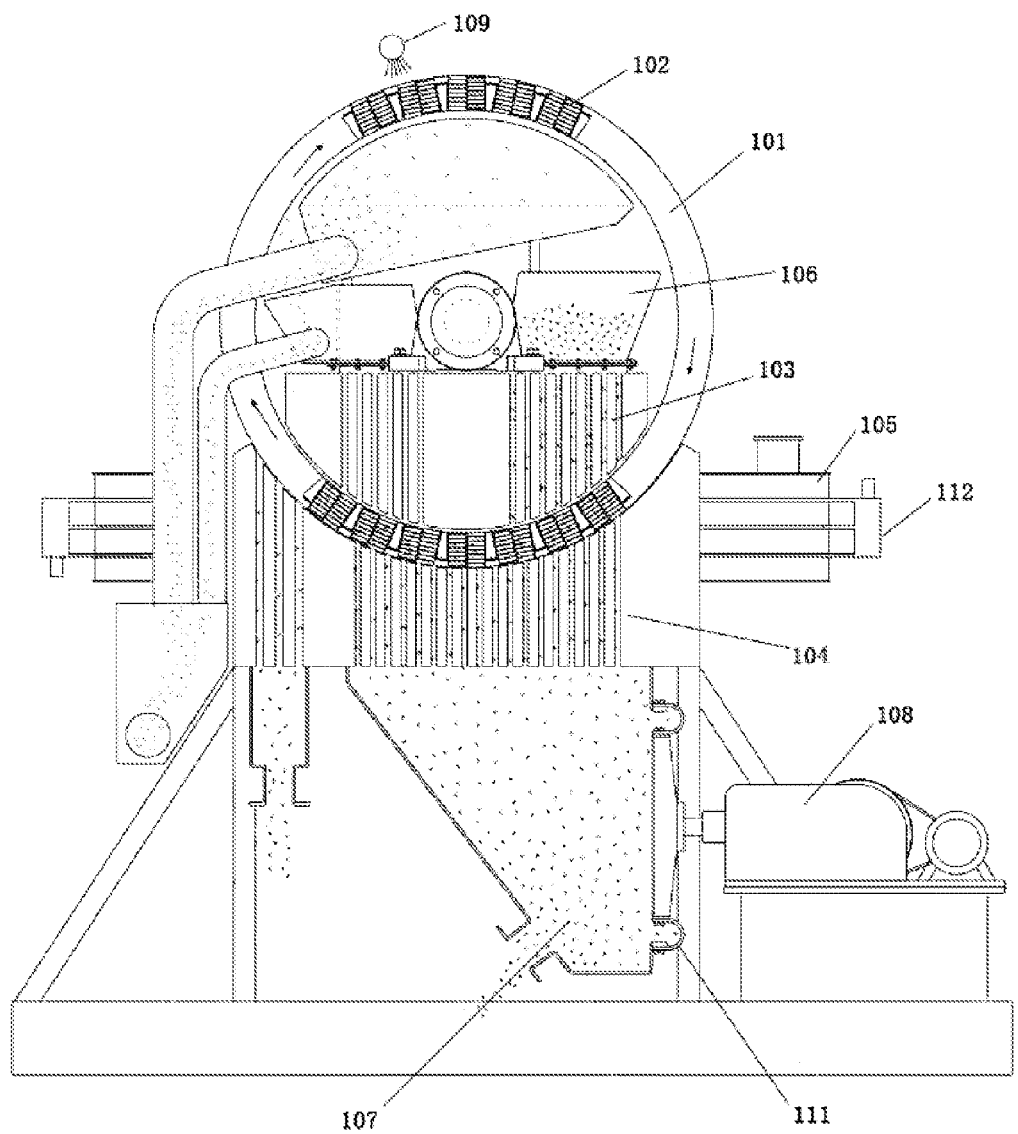
FIG. 2 is a schematic drawing of the vertical ring magnetic separator used in one preferred embodiment of the invention.

The structure of vertical ring magnetic separator used for the following examples is shown in FIG. 2. The vertical ring magnetic separator comprises a rotating ring 101, an inductive medium 102, an upper iron yoke 103, a lower iron yoke 104, a magnetic exciting coil 105, a feeding opening 106 and a tailing bucket 107, and also comprises a pulsating mechanism 108 and a water washing device 109.

The rotating ring 101 is a circular ring shaped carrier in which the inductive medium 102 is carried. When the rotating ring 101 is rotated, the inductive medium 102 and the matters adsorbed thereon move together, so as to separate the adsorbed matters. The rotating ring 101 may be made of any suitable material, such as carbon steel etc.

An electric motor or other driving device can provide power to the rotating ring 101 such that the rotating ring 101 can rotate in a set speed.

When parameters, such as iron content or treating amount of the material to be treated is lower than a predetermined value, a relatively low rotating speed, such as 3 rpm, may be used, in order to make the ferromagnetic impurities having sufficient time to be adsorbed onto the inductive medium meshes under the act of magnetic field, and being separated.

The inductive medium 102 is arranged in the rotating ring. The magnetic field generated by the magnetic exciting coil 105 makes the upper iron yoke 103 and the lower iron yoke 104 to be a pair of magnetic poles generating magnetic field along the vertical direction. The upper iron yoke 103 and the lower iron yoke 104 are arranged at the inner and outer sides of the lower portion of the rotating ring 101 such that the rotating ring 101 rotates between the magnetic poles. When the rotating ring 101 rotates, the inductive medium 102 in the rotating ring 101 will pass the pair of magnetic poles made up of the upper iron yoke 103 and the lower iron yoke 104 and be magnetized for removing the iron.

The inductive medium 102 may be layers of steel plate meshes. The steel plate meshes are made of 1Cr17. Each layer of steel plate meshes is woven by wires, with the mesh grid having a rhomb shape. The edges of the wires have prismatic sharp angles. The upper iron yoke 103 is communicated with the feeding opening 106 and the lower iron yoke 104 is communicated with the tailing bucket 107 which is used for discharging materials. The steel plate meshes have a medium layer spacing of 3 mm. The magnetic exciting coil 105 is formed of flat wire solenoid coil which is aluminum coated by varnish and doubly enwrapped by fiberglass and is solid conductor. The current passing through the magnetic exciting coil 105 is continuously adjustable, and thus the strength of the magnetic field generated by the magnetic exciting coil 105 is also continuously adjustable.

The vertical ring magnetic separator further comprises a pulsating mechanism 108 coupled with the tailing bucket 107 via a rubber plate 111. The pulsating mechanism can be achieved by an eccentric link mechanism, such that the alternating force generated by the pulsating mechanism 108 pushes the rubber plate 111 to move forth and back, it is possible for the mineral slurry in the tailing bucket 107 to generate pulsations.

The water washing device 109 is arranged above the rotating ring 101, for flushing the magnetic particles into the concentrate hopper 113 by water flow. The water washing device 109 may be various suitable flushing or spraying device, such as a spraying nozzle, water pipe, etc.

The feeding opening 106 is communicated with a slot of the upper iron yoke 103 such that the fly ash can pass through the rotating ring 101. The feeding opening 106 may be a feeding hopper or a feeding pipe. The feeding opening 106 is configured for feeding the mineral slurry, such that the mineral slurry enters the upper iron yoke 103 with a relatively small fall for preventing the magnetic particles from penetrating the inductive medium 102 due to gravity, thus improving the effect of magnetically separating and impurities removing.

The vertical ring magnetic separator further comprises a cooling device 112, which is provided adjacent to the magnetic exciting coil for decreasing the working temperature of the magnetic exciting coil. The cooling device is a pressure balance chamber water jacket.

The pressure balance chamber water jacket is made of stainless steel material, and thus is not prone to scale. As pressure balance chambers are respectively mounted to the inlet and outlet of the water jacket, they ensure that the water flows uniformly through each layer of water jacket and fills throughout the inside of the jacket, thus preventing any local water from taking a shortcut which otherwise would affect heat dissipation. Each layer of water jacket has a water passage with a large cross-section area, and thus it is possible to completely avoid blocking due to scaling. Even if there is a block somewhere, the normal flowing of the circulating water in the water jacket will not be affected. Moreover, the water jacket is in close contact with the coil by a large contacting area, thus most heat generated by the coil can be taken away by the water flow.

The pressure balance chamber water jacket, as compared with the common hollow copper tube for heat dissipation, shows high heat dissipation efficiency, small temperature rise of the windings, and low exciting power. In case of a rated exciting current of 40 A, the magnetic separator with the pressure balance chamber water jacket for heat dissipation can be reduced from 35 kw to 21 kw.

When the magnetic separator apparatus is working, the fed mineral slurry flows along a slot of the upper iron yoke 103 then through the rotating ring 101. As the inductive medium 102 in the rotating ring 101 is magnetized in the background magnetic field, a magnetic field with very high magnetic induction strength (such as 22,000 Gs) is formed at the surface of the inductive medium 102. The magnetic particles in the mineral slurry, under the effect of the very high magnetic field, are adhered to the surface of the inductive medium 102, and rotated with the rotating ring 101 going into the region without magnetic field at top of the rotating ring 101. Then, the magnetic particles are flushed into the concentrate hopper by the water washing device 109 located above the top of the rotating ring. The non-magnetic particles flow along the slots of the lower iron yoke 104 into the tailing bucket 107 and then are discharged via a tailing exit of the tailing bucket 107.

In the following Examples and Comparative Examples, the circulating fluidized-bed fly ash discharged by a thermal power plant is used as the raw material and its chemical components are shown in Table 1.

TABLE 1

| Chemical components of circulating fluidized-bed fly ash (wt %) | | | | | | | | | | | | |
|---|---|---|---|---|---|---|---|---|---|---|---|---|
| $SiO_2$ | $Al_2O_3$ | $TiO_2$ | CaO | MgO | $TFe_2O_3$ | FeO | $K_2O$ | $Na_2O$ | LOS | $SO_3$ | Total |
| 34.70 | 46.28 | 1.48 | 3.61 | 0.21 | 1.54 | 0.22 | 0.39 | 0.17 | 7.17 | 1.32 | 95.77 |

EXAMPLE 1

(1) Crushing the circulating fluidized-bed fly ash to a size of 200 mesh, adding water into the crushed fly ash to prepare a slurry having a solid content of 33 wt %, removing iron contained in the slurry by wet magnetic separation using the vertical magnetic separator as illustrated in FIG. 2 for two times at a magnetic field strength of 15,000 Gs, such that the iron content of the fly ash was reduced to 0.76 wt %, and pressure-filtering the slurry by a plate-and-frame filter press to form a filter cake having a solid content of 37.5 wt %;

(2) adding industrial hydrochloric acid having a concentration of 28 wt % into the filter cake to perform acid-leaching reaction, wherein the molar ratio of HCl contained in the hydrochloric acid to alumina contained in the fly ash was 5:1, the reaction temperature was 150° C., the reaction pressure was 1.0 MPa and the reaction time was 2 h, and then pressure-filtering and washing the discharged reaction product to yield a hydrochloric leachate having pH of 1.5;

(3) cooling the hydrochloric leachate till its temperature was 65° C. by means of heat-exchange, then passing the hydrochloric leachate through a resin column (single column) loaded with D001 Resin (Anhui Wandong Chemical Plant) to deeply remove iron to obtain a refined aluminum chloride solution, wherein the flow flux of the hydrochloric leachate was 2 times over resin volume per hour;

(4) subjecting the refined aluminum chloride solution to a vacuum concentration, wherein the pressure was −0.05 MPa and the temperature was 80° C., then cooling and crystallizing the concentrated solution, the weight of the crystal formed out of the solution was controlled to 50% with respect to the initial weight of the refined aluminum chloride solution, and conducting a centrifugation separation to obtain aluminum chloride crystal;

(5) calcining the aluminum chloride crystal obtained from step (4) at 400° C. for 2 hours and then at a 1100° C. for 2 hours to obtain the alumina The chemical components of the above alumina product were measured and shown in Table 2.

The macro-porous cationic resin (D001 Resin) regained adsorption capacity after subjecting to elution and regeneration when its adsorption reached saturation. The conditions of elution were as follows: the eluent was hydrochloric acid with a concentration of 4 wt %, the eluting temperature was 50° C., the flow flux of the hydrochloric acid was 1 time over resin volume per hour, and the total amount of the eluent used for elution was 2 times over the volume of the resin. The hydrochloric acid with a concentration of 4 wt % was used for the regeneration of the resin. The conditions of regeneration were as follows: the temperature was 40° C., the flow flux of the hydrochloric acid was 2 times over resin volume per hour, and the total amount of the hydrochloric acid used for regeneration was 1 time over the volume of the resin.

EXAMPLE 2

The operation conditions were the same as those of Example 1 except step (1). Step (1) is adjusted as follows:

Crushing the circulating fluidized-bed fly ash to a size of 300 mesh, adding water therein to prepare a slurry having a solid content of 25 wt %, removing iron from the slurry by wet magnetic separation using the vertical magnetic separator as illustrated in FIG. 2 for three times at a magnetic field strength of 10,000 Gs, such that the iron content of the fly ash was reduced to 0.81 wt %, and pressure-filtering the slurry by the plate-and-frame filter press to form a filter cake having a solid content of 32.0 wt %.

The chemical components of the obtained alumina product were measured and shown in Table 2.

EXAMPLE 3

The operation conditions were the same as those of Example 1 except step (1). Step (1) was adjusted as follows:

Crushing the circulating fluidized-bed fly ash to a size of 150 mesh, adding water therein to prepare a slurry having a solid content of 40 wt %, removing iron from the slurry by wet magnetic separation using the vertical magnetic separator as illustrated in FIG. 2 for two times at a magnetic field strength of 20,000 Gs, such that the iron content of the fly ash was reduced to 0.69 wt %, and pressure-filtering the slurry by the plate-and-frame filter press to form a filter cake having a solid content of 43.0 wt %.

The chemical components of the obtained alumina product were measured and shown in Table 2.

EXAMPLE 4

The operation conditions were the same as those of Example 1 except step (2). Step (2) was adjusted as follows:

Adding industrial hydrochloric acid having a concentration of 20 wt % into the filter cake to perform acid-leaching reaction, wherein the molar ratio of HCl contained in the hydrochloric acid to alumina contained in the fly ash was 9:1, the reaction temperature was 200° C., the reaction pressure was 2.1 MPa and the reaction time was 2 h, and pressure-filtering and washing the discharged reaction product to yield a hydrochloric leachate having pH of 1.4.

The chemical components of the obtained alumina product were measured and shown in Table 2.

EXAMPLE 5

The operation conditions were the same as those of Example 1 except step (2). Step (2) was adjusted as follows:

Adding industrial hydrochloric acid having a concentration of 37 wt % into the filter cake to perform acid-leaching reaction, wherein the molar ratio of HCl contained in the hydrochloric acid to alumina contained in the fly ash was 4:1, the reaction temperature was 110° C., the reaction pressure was 0.15 MPa and the reaction time was 2 h, and pressure-filtering washing the discharged reaction product to yield a hydrochloric leachate having pH of 1.7.

The chemical components of the obtained alumina product were measured and shown in Table 2.

EXAMPLE 6

The operation conditions were the same as those of Example 1 except step (3). Step (3) was adjusted as follows:

Cooling the hydrochloric leachate till its temperature was 90° C. by means of heat-exchange, then passing the hydrochloric leachate through resin columns (two columns in series) loaded with 732 Resin (Anhui Sanxing Resin Ltd., Co) to deeply remove iron to obtain a refined aluminum chloride solution, wherein the flow flux of the hydrochloric leachate was 4 times over resin volume per hour.

The macro-porous cationic resin (732 Resin) regained adsorption capacity after subjecting to elution and regeneration when its adsorption reached saturation. The conditions of elution were as follows: the eluent was water, the eluting temperature was 60° C., the flow flux of the water was 1 time over resin volume per hour, and the total amount of the eluent used for elution was 3 times over the volume of the resin. The hydrochloric acid with a concentration of 6 wt % was used for the regeneration of the resin. The conditions of regeneration were as follows: the temperature was 50° C., the flow flux of the hydrochloric acid was 3 times over resin volume per hour, and the total amount of the hydrochloric acid used for regeneration was 2 times over the volume of the resin.

The chemical components of the obtained alumina product were measured and shown in Table 2.

EXAMPLE 7

The operation conditions were the same as those of Example 1 except step (3). Step (3) was adjusted as follows:

Cooling the hydrochloric leachate till its temperature was 30° C. by means of heat-exchange, then passing the hydrochloric leachate through resin columns (two columns in series) loaded with JK008 Resin (Anhui Wandong chemical plant) to deeply remove iron to obtain a refined aluminum chloride solution, wherein the flow flux of the hydrochloric leachate was 4 times over resin volume per hour.

The macro-porous cationic resin (JK008 Resin) regained adsorption capacity after subjecting to elution and regeneration when its adsorption reached saturation. The conditions of elution were as follows: the eluent was hydrochloric acid with a concentration of 8 wt %, the eluting temperature was 30° C., the flow flux of the hydrochloric acid was 2 times over resin volume per hour, and the total amount of the eluent used for elution was 1 time over the volume of the resin. The hydrochloric acid with a concentration of 2 wt % was used for the regeneration of the resin. The conditions of regeneration were as follows: the temperature was 20° C., the flow flux of the hydrochloric acid was 2 times over resin volume per hour, and the total amount of the hydrochloric acid used for regeneration was 1 time over the volume of the resin.

The chemical components of the obtained alumina product were measured and shown in Table 2.

EXAMPLE 8

The operation conditions were the same as those of Example 7 except that the JK008 Resin was changed to SPC-1 Resin (Shanghai Resin Plant).

The chemical components of the obtained alumina product were measured and shown in Table 2.

EXAMPLE 9

The operation conditions were the same as those of Example 1 except step (4). Step (4) was adjusted as follows:

Subjecting the refined aluminum chloride solution to a vacuum concentration, wherein the pressure was −0.03 MPa and the temperature was 95° C., then cooling and crystallizing the concentrated solution, the weight of the crystal formed out of the solution was controlled to 40% with respect to the initial weight of the refined aluminum chloride solution, and conducting a vacuum filtration to obtain aluminum chloride crystal.

The chemical components of the obtained alumina product were measured and shown in Table 2.

EXAMPLE 10

The operation conditions were the same as those of Example 1 except step (5). Step (5) was adjusted as follows:

Calcining the aluminum chloride crystal obtained from step (4) at 1200° C. for 3 hours to obtain the alumina product.

The chemical components of the obtained alumina product were measured and shown in Table 2.

EXAMPLE 11

The operation conditions were the same as those of Example 1 except step (5). Step (5) was adjusted as follows:

Calcining the aluminum chloride crystal obtained from step (4) at 500° C. for 2 hours and then calcining the aluminum chloride crystal at 950° C. for 2 hours to obtain the alumina.

The chemical components of the obtained alumina product were measured and shown in Table 2.

COMPARATIVE EXAMPLE 1

Steps (2)-(5) are the same as those of Example 1 but step (1) was omitted. That is, the fly ash reacted with acid directly without magnetic separation.

The chemical components of the obtained alumina product were measured and shown in Table 2.

COMPARATIVE EXAMPLE 2

Steps (1), (2), (4) and (5) are the same as those of Example 1 but step (3) was omitted.

That is, the acid leathate was subjected to concentration, crystallization and calcination without removing iron by resin. Moreover, the magnetic separator used in step (1) was CTD wet magnetic separator (Shanghai Yi Sheng Mining Machinery Ltd., Co).

The chemical components of the obtained alumina product were measured and shown in Table 2.

TABLE 2

| Chemical Components of the Alumina Products | | | | | |
|---|---|---|---|---|---|
| | Chemical Components (wt %) | | | | |
| Examples | $Al_2O_3$ | $SiO_2$ | $Fe_2O_3$ | $Na_2O$ | Ignition loss |
| Example 1 | 99.2 | 0.018 | 0.002 | 0.06 | 0.7 |
| Example 2 | 99.2 | 0.018 | 0.004 | 0.06 | 0.7 |

TABLE 2-continued

Chemical Components of the Alumina Products

| Examples | Chemical Components (wt %) | | | | |
|---|---|---|---|---|---|
| | $Al_2O_3$ | $SiO_2$ | $Fe_2O_3$ | $Na_2O$ | Ignition loss |
| Example 3 | 99.2 | 0.018 | 0.003 | 0.06 | 0.7 |
| Example 4 | 99.1 | 0.017 | 0.003 | 0.05 | 0.8 |
| Example 5 | 99.1 | 0.019 | 0.004 | 0.06 | 0.8 |
| Example 6 | 99.1 | 0.019 | 0.003 | 0.07 | 0.8 |
| Example 7 | 99.1 | 0.018 | 0.002 | 0.07 | 0.8 |
| Example 8 | 99.1 | 0.019 | 0.003 | 0.07 | 0.8 |
| Example 9 | 99.2 | 0.015 | 0.002 | 0.05 | 0.7 |
| Example 10 | 99.3 | 0.020 | 0.003 | 0.07 | 0.6 |
| Example 11 | 98.9 | 0.017 | 0.002 | 0.05 | 1.0 |
| Comparative Example 1 | 98.8 | 0.018 | 0.031 | 0.07 | 1.1 |
| Comparative Example 2 | 95.2 | 0.020 | 3.525 | 0.07 | 1.2 |

Note:
The $Al_2O_3$ content equals to 100% minus the total amount of all impurities listed in Table 2.

The invention claimed is:

1. A method for preparing metallurgical-grade alumina by using fluidized-bed fly ash, comprising the following steps:
   a) crushing the fly ash to a size of 100 mesh or smaller, adding water into the crushed fly ash to prepare a slurry having a solid content of 20-40 wt %, removing iron from the slurry by wet magnetic separation, such that Fe content of the fly ash is reduced to 1.0 wt % or less, and filtering the slurry to obtain a filter cake;
   b) adding hydrochloric acid into the filter cake to react the fly ash with the hydrochloric acid, and then subjecting the reaction product to solid-liquid separation and rinse to yield a hydrochloric leachate having a pH value in the range of 1-3;
   c) passing the hydrochloric leachate through a column loaded with a cationic resin to further remove iron to obtain a refined aluminum chloride solution;
   d) subjecting the refined aluminum chloride solution to vacuum concentration, then cooling the concentrated solution for crystallization, and conducting solid-liquid separation to obtain crystalline aluminum chloride; and
   e) calcining the crystalline aluminum chloride with a one-stage process at a temperature in the range of 900-1200° C. for 1-4 hours to obtain the metallurgical-grade alumina; or calcining the crystalline aluminum chloride with a two-stage process at a temperature in the range of 300-500° C. for 1-2 hours, then at an elevated temperature in the range of 900-1100° C. for additional 1-3 hours to obtain the metallurgical-grade alumina,
   wherein the cationic resin comprises a strong-acid styrene-based cationic-exchange resin.

2. The method according to claim 1, wherein in step e), calcining the crystalline aluminum chloride with the one-stage process at a temperature in the range of 950-1100° C. for 1-4 hours to obtain the metallurgical-grade alumina.

3. The method according to claim 1, wherein in step b), the concentration of the hydrochloric acid is 20-37 wt %; the molar ratio of HCl contained in the hydrochloric acid to alumina contained in the fly ash is 4:1-9:1.

4. The method according to claim 3, wherein in step b), the reaction temperature is 100-200° C.; the reaction time is 0.5-4.0 hours; and the reaction pressure is 0.1-2.5 MPa.

5. The method according to claim 1, wherein in step c), passing the hydrochloric leachate through the column loaded with the cationic resin from bottom to top with a volume flux of 1-4 times over resin volume per hour at 20-90° C.

6. The method according to claim 1, wherein in step d), the vacuum concentration is performed under a pressure in the range of −0.03 to −0.07 MPa and at a temperature in the range of 50-110° C.

7. The method according to claim 1, wherein in step d), during cooling the refined aluminum chloride solution for crystallization, the weight of crystal formed out of the solution is controlled to 40-65% with respect to the initial weight of the refined aluminum chloride solution.

8. The method according to claim 1, wherein hydrogen chloride gas generated in step e) is absorbed by an absorbing column in a circular manner and prepared as hydrochloric acid which is recycled to step b).

9. The method according to claim 1, wherein in step b), a mother liquid obtained after the solid-liquid separation is recycled to the refined aluminum chloride solution in step c).

10. The method according to claim 1, wherein in step a), a vertical ring magnetic separator is used for removing iron by wet magnetic separation, which comprises a rotating ring, an inductive medium, an upper iron yoke, a lower iron yoke, a magnetic exciting coil, a feeding opening, a tailing bucket and a water washing device, wherein the feeding opening is used for feeding the coal ash to be de-ironed, the tailing bucket is used for discharging the non-magnetic particles after de-ironing, the upper iron yoke and the lower iron yoke are respectively arranged at the inner and outer sides of the lower portion of the rotating ring, the water washing device is arranged above the rotating ring, the inductive medium is arranged in the rotating ring, the magnetic exciting coil is arranged at the periphery of the upper iron yoke and the lower iron yoke so as to make the upper iron yoke and the lower iron yoke to be a pair of magnetic poles for generating a magnetic field in the vertical direction, and wherein the inductive medium is layers of steel plate meshes, each steel plate mesh is woven by wires, and the edges of the wires have prismatic sharp angles.

11. The method according to claim 10, wherein the vertical ring magnetic separator further comprises a pressure balance chamber water jacket disposed adjacent to the magnetic exciting coil.

12. The method according to claim 11, wherein the steel plate mesh has a medium layer spacing of 2-5 mm; the steel plate mesh is made of 1Cr17.

13. The method according to claim 12, wherein the steel plate mesh has a thickness of 0.8-1.5 mm, a mesh grid size of 3 mm×8 mm-8 mm×15 mm, and a wire width of 1-2 mm.

14. The method according to claim 13, wherein the vertical ring magnetic separator further comprises a pulsating mechanism, which is coupled with the tailing bucket via a rubber plate.

15. The method according to claim 14, wherein the inductive medium is provided in the entire circle of the rotating ring.

16. The method according to claim 15, wherein the magnetic exciting coil is a flat wire solenoid coil which is aluminum coated by varnish and doubly enwrapped by fiberglass.

17. The method according to claim 16, wherein the magnetic field strength of the vertical ring magnetic separator is 15,000 Gs or more.

18. The method according to claim 3, wherein in step b), the concentration of the hydrochloric acid is 20-30 wt %; the molar ratio of HCl contained in the hydrochloric acid to alumina contained in the fly ash is 4.5:1-6:1.

19. The method according to claim 4, wherein in step b), the reaction temperature is 130-150° C.; the reaction time is 1.5-2.5 hours; and the reaction pressure is 0.3-1.0 MPa.

20. The method according to claim 1, wherein in step c), passing the hydrochloric leachate through the column loaded with the macro-porous cationic resin from bottom to top with a volume flux of 1-4 times over resin volume per hour at 60-80° C.

21. The method according to claim 6, wherein in step d), the vacuum concentration is performed under a pressure in the range of −0.04 to −0.06 MPa and at a temperature in the range of 70-80° C.

22. The method according to claim 12, wherein the steel plate mesh has a medium layer spacing of 3 mm.

23. The method according to claim 13, wherein the steel plate mesh has a thickness of 1 mm, a mesh grid size of 5 mm×10 mm, and a wire width of 1.6 mm.

24. The method according to claim 17, wherein the magnetic field strength of the vertical ring magnetic separator is 15,000-20,000Gs.

25. The method according to claim 17, wherein the magnetic field strength of the vertical ring magnetic separator is 15,000-17,500 Gs.

\* \* \* \* \*